United States Patent
Chopra et al.

(10) Patent No.: US 9,946,632 B1
(45) Date of Patent: Apr. 17, 2018

(54) SELF-SERVICE CUSTOMER ESCALATION INFRASTRUCTURE MODEL

(71) Applicant: EMC IP Holding Company LLC, Hopkinton, MA (US)

(72) Inventors: Shelesh Chopra, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/500,595

(22) Filed: Sep. 29, 2014

(51) Int. Cl.
*G06F 11/36* (2006.01)

(52) U.S. Cl.
CPC ...... *G06F 11/3672* (2013.01); *G06F 11/3664* (2013.01); *G06F 11/3684* (2013.01)

(58) Field of Classification Search
CPC ............. G06F 11/3664; G06F 11/3672; G06F 11/3684; G06F 11/3668; G06F 11/3604; G06F 11/362
USPC ........................................................ 717/124
See application file for complete search history.

(56) References Cited

U.S. PATENT DOCUMENTS

| | | | |
|---|---|---|---|
| 8,713,554 B1 | 4/2014 | Chopra et al. | |
| 8,769,102 B1 * | 7/2014 | Zhou ................... | G06F 11/3696 709/223 |
| 2004/0128651 A1 * | 7/2004 | Lau ................................ | 717/124 |
| 2006/0041869 A1 * | 2/2006 | Houston ............. | G06F 11/0715 717/131 |
| 2007/0005320 A1 * | 1/2007 | Vinberg et al. .................. | 703/13 |
| 2007/0168970 A1 * | 7/2007 | Li et al. ......................... | 717/124 |
| 2008/0120602 A1 * | 5/2008 | Comstock et al. ............ | 717/125 |
| 2009/0316587 A1 * | 12/2009 | Omar ...................... | H04L 43/50 370/245 |
| 2011/0185231 A1 * | 7/2011 | Balestrieri et al. .............. | 714/27 |
| 2012/0066682 A1 * | 3/2012 | Al-Aziz et al. ............... | 718/100 |
| 2012/0265959 A1 * | 10/2012 | Le ...................... | G06F 17/30067 711/162 |
| 2016/0034382 A1 * | 2/2016 | Kumar ................. | G06F 11/3676 717/124 |
| 2016/0036686 A1 * | 2/2016 | Vendrow ............... | H04L 45/021 370/254 |

* cited by examiner

*Primary Examiner* — Li B. Zhen
*Assistant Examiner* — Zengpu Wei
(74) *Attorney, Agent, or Firm* — Staniford Tomita LLP

(57) ABSTRACT

A service request from a customer is received at a first computer system. The service request concerns an issue with an application that is installed in a second computer system of the customer. The service request includes a set of fields, and corresponding values inputted by the customer. The service request is parsed to identify the application, the operating system (OS) of the second computer system, and a configuration setting. Code modules automatically create and configure the testing environment so that the environment includes the application, the operating system, and configuration specified in the service request. A test case is then executed in the testing environment, and a notification is generated that includes a result of the executed test case.

20 Claims, 13 Drawing Sheets

505 →

| SR ID | Customer | Product Name | Version | OS Name | Issue Type | Description |
|---|---|---|---|---|---|---|
| SR001 | Signal Insurance | NetWorker MS Module | 3.0 | Windows 7 | Backup | Full backups of database with no change only achieves 80% dedupe |
| SR002 | Jupiter Office | LedgerPro | 1.6 | Windows 7 | Reconciliation | Unable to reconcile accounts |
| ... | ... | ... | ... | ... | ... | ... |

| OS ID | OS Name | Version | File |
|---|---|---|---|
| OS001 | Windows NT | 6.3 | winNT6.3.iso |
| OS002 | Linux | 3.16.1 | linux3.16.1.iso |
| ... | ... | ... | ... |

| Product ID | Product Name | Version | File |
|---|---|---|---|
| SW001 | NetWorker MS Module | 3.0 | networker3.0.iso |
| SW002 | LedgerPro | 1.6 | ledgerpro1.6.iso |
| ... | ... | ... | ... |

| Test Case ID | Area Tested |
|---|---|
| TC001 | Backup |
| TC002 | Recovery |
| TC003 | Cloning |
| TC004 | Licensing |
| ... | ... |

| Testing Environment ID | SR ID | Date Created | File |
|---|---|---|---|
| TE001 | SR001 | April 20, 2014 | 01testenv.iso |
| TE002 | SR002 | July 5, 2014 | 02testenv.iso |
| ... | ... | ... | ... |

Service Request (SR)

1238

1241

Customer

Product

Version

OS

Version

Memory          CPU

Disk Capacity

Issue Description

Issue Type

Cancel          Submit

```
--- = General Info = ---
Customer: ABC ENTERPRISES, INC.
Party#: 11853710
```
Cust Priority: Elite A1
```
Region/District#: 41000 CS Area / 41110 AM CS District Severity: S1
Product: NetWorker Module for Microsoft
SR type: Software
Version/SN: 3.0 /
SR status: Open - Eng Activity
SR owner: Networker Core - Doe, John
Problem description: Full backups of database with no change only achieves 80% dedupe SR Opened: 04-JUL-2014 02:02:47 EST
SR Last Update: 13-AUG-2014 02:47:24 EST
SR Next Action Due: 13-AUG-2014 23:00:00 EST Customer Contact: Eod, Mark
Customer Mail: Mark.Eod@example.com
Customer Phone: 55553061256
Address 1: 10 ALDERAAN ROAD
Address 2:
City: Endor
State: NJ
Country: US
Postal Code: 55555
```

- = 13-AUG-2014 02:46:50 EST – John Doe - Customer - SET Update = -

Figure 15

SELF-SERVICE CUSTOMER ESCALATION INFRASTRUCTURE MODEL

BACKGROUND

The present invention relates generally to the field of information technology, and, more particularly, to systems and techniques for testing software.

Software quality assurance (QA) is an important part of the software development process. Software QA helps to ensure that the software product is relatively free of issues, bugs, or other defects prior to the product being deployed in a customer environment. Unfortunately, issues do arise because it is very difficult to anticipate all the different conditions in which the software will be used.

Thus, every product lifecycle includes a phase of sustaining where the release products are being supported throughout their lifetime. No matter how good the product is designed, it can still run into supportability issues. There can be service requests coming out from the field which need to be supported by support as well as by an escalation engineering team. Typically, if the support team is unable to resolve the issue, the issue will be escalated to the escalation engineering team to examine. Often, the escalation engineering team spends a large amount of time obtaining the required information and setup/environment details, and reproducing the issue.

These issues can range from relatively benign usability issues to major system failures. For example, software bugs have lead to outages and disruptions of stock exchanges, e-commerce sites, corporate email, enterprise backup and recovery systems, order fulfillment systems, supply change management systems, and so forth.

When such issues are discovered, it is important that the problem is quickly isolated and addressed. However, the environments in which such applications, especially enterprise applications, run have become extremely complex. As a result, it often requires a tremendous effort and a large amount of time to create a realistic testing environment in which an attempt can be made to reproduce the issue. Previous approaches were also prone to error and subjective interpretation regarding the customer's configuration environment. Subsequent issues regarding the same application required repeating a number of manual steps to recreate the testing environment.

Thus, there is a need to provide systems and techniques for facilitating the creation of testing environments to quickly address software failure issues.

BRIEF DESCRIPTION OF THE FIGURES

FIG. 5 shows an example of a table for storing service requests.

FIG. 6 shows an example of a table for storing operating systems.

FIG. 7 shows an example of a table for storing software products.

FIG. 8 shows an example of a table for storing test cases.

FIG. 9 shows an example of a table for storing testing environments.

FIG. 12B shows an example of service request template in a specific embodiment of the system.

FIG. 15 shows an example of information that may be included in a service request in a specific embodiment of the system.

DETAILED DESCRIPTION

Figure 1:
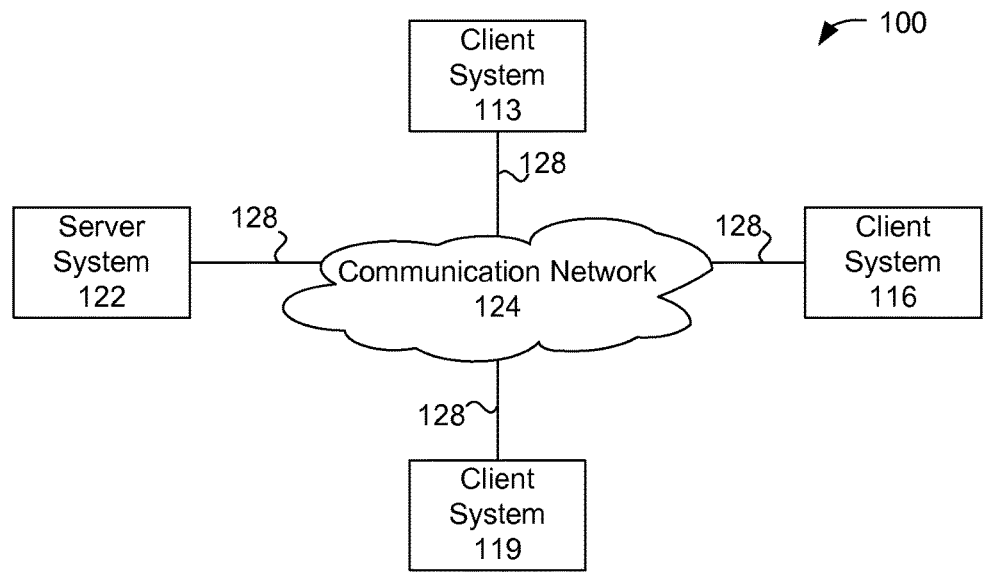
FIG. 1 shows a block diagram of a client-server system and network in which an embodiment of the system may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, Google Chrome provided by Google, Safari provided by Apple Inc., and the Firefox browser provided by Mozilla Foundation, and others.

Figure 2:
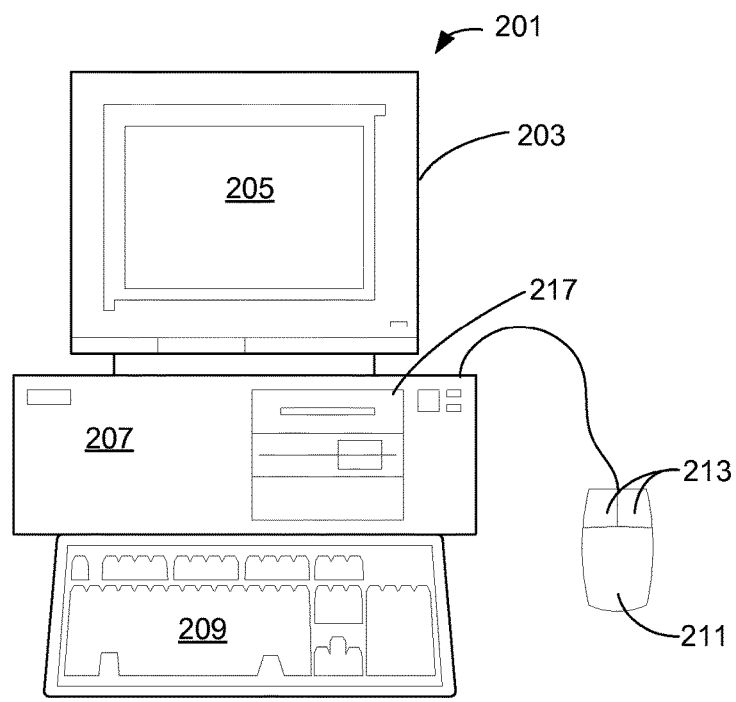
FIG. 2 shows a more detailed diagram of an example of a client or computer which may be used in an embodiment of the system.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, or through a network such as the Internet.

Figure 3:
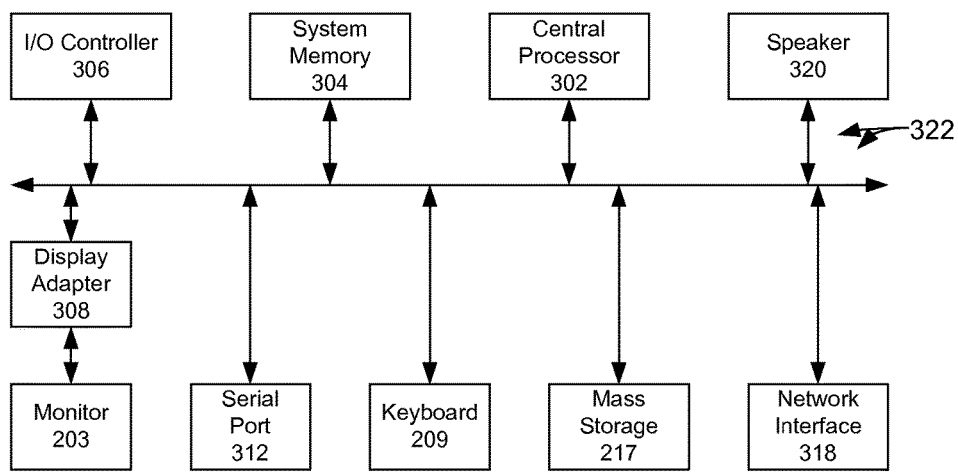
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or any other appropriate programming language). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows CE, Windows Mobile, Windows 8), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
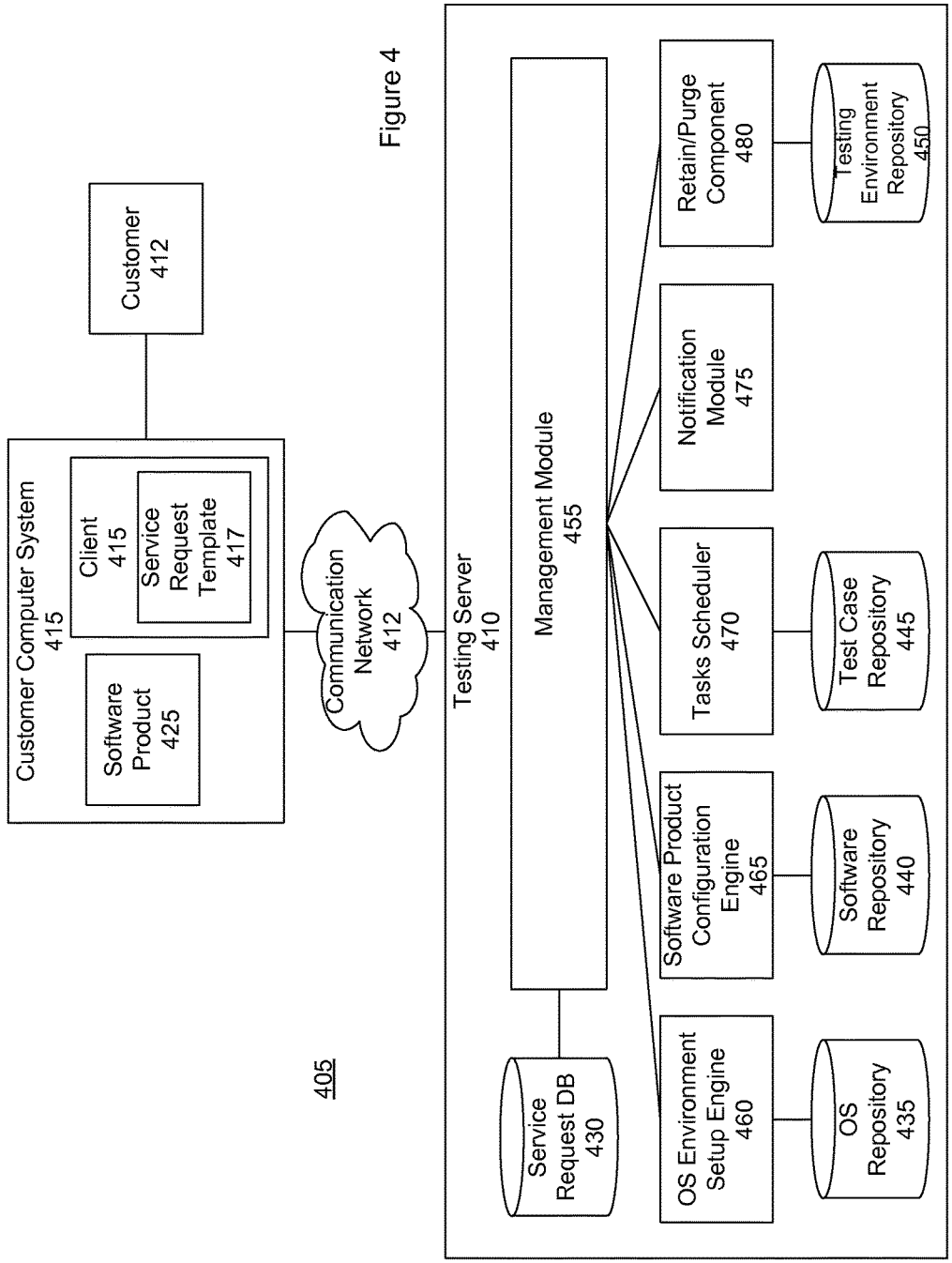
FIG. 4 shows an overall block diagram of a system for automatically creating a software testing environment.

FIG. 4 shows an overall architecture of a specific embodiment of a system 405 for automatically creating and configuring a testing, setup, or reproduction environment. In a specific embodiment, the environment is created in response to receiving a service request (SR) concerning an issue about a software product (e.g., application) encountered by a user or customer. The issue may include, for example, a software bug such as an error, flaw, failure, problem, or fault in a computer program, system, or service that causes it to produce an incorrect or unexpected result, or to behave in unintended ways.

Once the testing environment has been created and properly configured, test cases are automatically executed in the testing environment to determine whether the issue can be reproduced. A notification is generated that includes a result of the testing.

In a specific embodiment, techniques are provided for automating the process of setting up a reproduction or test environment. In this specific embodiment, the test environment is setup automatically by parsing the various keywords from the service requests intelligently, i.e., with little or no user involvement. There can be a standard service request or customer escalation template that includes, for example, the software version, configuration parameters (e.g., resource database), operating system version and bitness (e.g., 32-bit Windows OS versus 64-bit Windows OS), and other metadata information that may be needed. The system parses this through an interpreter which in-turn communicates with different sub-modules or code modules that will create the environment. The environment can be created automatically and without or with little user intervention.

More particularly, as shown in the example of FIG. 4, there is a testing server system 410. A customer 412 at a client 415 can submit to the server via a communication network 412 a service request 417. The service request may concern an issue about a software product 425 being used by or installed at the customer computer system.

The communication network is as shown in FIG. 1 and described above. The client can include a general purpose computer with hardware and software, such as shown in FIGS. 2-3 and described above. Software products can include application programs, services, business and productivity software, backup and recovery software, games, enterprise resource planning (ERP) software, distributed applications, databases, client-server applications, storage management software, cloud computing applications, cloud services, virtualization software, and any other appropriate program.

The testing server includes components similar to the components shown in FIG. 3 and described above. For example, the server may include a processor, memory, applications, and storage. In a specific embodiment, the storage includes a service request database 430, an operating system repository 435, a software product repository 440, a test case repository 445, and a testing or setup environment backup repository 450.

The service request database stores service requests that are received from the customer. FIG. 5 shows an example of a table 505 that may be found in the service request database. The table may include fields such as a service request identifier, customer name, product name, version, operating system name, issue type, and issue description.

Operating system repository 435 (FIG. 4) stores a set of operating systems (OS) (e.g., Windows, DOS, Linux, Solaris x86, or NetWare). FIG. 6 shows an example of a table 605 that may be found in the OS repository to help organize the stored operating systems. The table may include fields such as an OS ID, OS name, version, and OS file (e.g., image file of the operating system). For example, the operating system may be stored as a raw disk image or an image file (e.g., formatted as an ISO (International Organization for Standards) IMG file, UDF file, or DMG file).

Software product repository 440 (FIG. 4) stores any number of software products such as applications, databases, and so forth. FIG. 7 shows an example of a table 705 that may be found in the software product repository to help organize the stored software products. The table may include fields such as a product identifier, product name, version, and software product file. In a specific embodiment, the software product (and operating system) are stored as image or disk image files. It should be appreciated, however, that the software product (and operating system, or both) may instead or additionally be stored using one or more other files in other file formats (e.g., executable files, data files, installation files, drivers, and so forth, or combinations of these).

Test case repository 445 (FIG. 4) stores a set of workflows for testing the software products. A feature of a particular software product may be associated with a particular test case for testing that feature. Depending upon the type of software, there can be test cases for functionality, integration, user interface, performance, security, database, licensing, and so forth. For example, for backup software there may be test cases to help ensure data can be properly backed-up and recovered. FIG. 8 shows an example of a table 805 that may be found in the test case repository to help organize the test case workflows. The table may include fields such as a test case identifier, and the area tested.

Setup environment backup repository 450 stores as backup any number of testing environments. In a specific embodiment, the test environments are backed-up and stored as raw disk image files. These backup image files may be tagged or associated with a service request, customer, or both. FIG. 9 shows an example of a table 905 that may be found in the test environment repository to help organize the stored testing environments. The table may include fields such as a setup environment identifier, service request identifier, timestamp, and testing environment disk image.

Disk images are computer files containing the contents and structure of a disk volume or an entire data storage device, such as a hard drive, tape drive, floppy disk, optical disc or USB flash drive. A disk image can be created by creating a sector-by-sector copy of the source medium, thereby perfectly replicating the structure and contents of a storage device independent of the file system. Depending on the disk image format, a disk image may span one or more computer files. In another specific embodiment, the testing environment may be stored using a different file format.

A management module 455 (FIG. 4) accesses the service request database to retrieve a customer service request. The management module includes an interpreter to parse the service request and identify the software product and configuration specified in the service request. The management module is further responsible for controlling, directing, or coordinating various sub-modules to automatically create a testing environment, configure the testing environment, run a test case, and generate a notification of the test results. In a specific embodiment, the sub-modules include an operating system (OS) environment setup engine 460, a configuration or resource database engine 465, a task scheduler 470, a notification module 475, and a retain/purge component 480.

The OS environment setup engine is responsible for obtaining the OS specified in the service request from the OS repository and installing the OS in the testing environment. The OS setup engine is also responsible for configuring the operating system according to the configuration specified in the request.

In a specific embodiment, the engine provisions or installs the OS in a virtual machine (VM). In this specific embodiment, the OS environment setup engine uses virtual machine templates on the fly to retrieve and create the OS of the required configuration. The test environment can be created within a virtual computing environment of the system that is remote, separate, or different from the customer computer system. A virtual machine is a software abstraction of a physical computer system that is installed as a "guest" on the "host" hardware platform. In a virtual machine environment, the hardware platform may be referred to as a host, host machine, or host computer. The host uses the virtualization software to run the virtual machines or virtual devices. Generally, virtualization is an abstraction layer that allows multiple virtual environments to run in isolation, side-by-side on the same physical machine.

A virtual machine can include a guest operating system, guest applications running on the guest operating system, and virtual hardware which represents a hardware state of the virtual machine. The virtualization software may include a hypervisor or virtual machine monitor (VMM) that presents the guest operating system with a virtual operating platform. Virtual hardware refers to the hardware resources allocated to the virtual machine and is mapped to the hardware platform. The virtual hardware may include virtual disks, virtual processors, virtual system memory, and various virtual devices for which the guest operating system includes corresponding drivers. A host hardware platform may host multiple virtual machines. Each virtual machine may be assigned an identifier such as an Internet Protocol (IP) address.

The software product configuration engine is responsible for obtaining the software product specified in the service request from product repository 440 and installing the product in the testing environment (e.g., installing the product in a virtual machine). This engine is also responsible for configuring the software according to the configuration specified in the service request.

In a specific embodiment, the software product includes NetWorker. NetWorker is a backup and recovery product developed by EMC Corporation. NetWorker includes a Remote Access Protocol (RAP) database which allows for NetWorker configuration information. In this specific embodiment, the engine is referred to as a resource database (DB) engine. The resource DB engine parses the configuration detail and applies the values for RAP resources (e.g., parallelism/devices, type of devices, and so forth).

The task scheduler is responsible for obtaining a test case associated with the specified issue from the test case repository and executing the test case in the testing environment. The tasks scheduler runs the battery of tests automatically that will simulate the customer issue.

The retain/purge component provides lifecycle management for the testing environments. Activities provided by the lifecycle management module include backing up and storing a disk image of a testing environment in the test/setup environment repository, retrieving a disk image of a test environment from the repository, and deleting the disk image from the repository. In a specific embodiment, the retain/purge component decides for how long the test/setup environment is to be retained/purged.

The notification module is responsible for providing notifications to the customer, test administrator, or both. A notification can include, for example, an email, text message, or other alert. A notification may be sent programmatically such as through an application programming interface (API). Notifications may be generated when, for example, the testing or setup environment is ready for a next stage, configuration of the testing environment has been completed, testing in the testing environment has been completed, the testing environment is about to be purged, and so forth. A notification may include a message indicating a result of the test (e.g., "customer issue was reproduced in the test environment," "customer issue was not able to be reproduced in the test environment," "test case failed," or "test case passed"), a number of days remaining until a testing environment is purged (e.g., "purging in X days"), and so forth.

The modules shown in FIG. 4 can be functional entities and in other cases, two or more modules can be combined into one module. For example, the management module may be combined with the OS environment setup engine. In other embodiments, the management module and the OS environment setup engine reside in separate code modules.

In a specific embodiment, the service request template includes a web page that is displayed within a browser program at the client. The web page can include a set of pre-defined fields, graphical user interface (GUI) controls, widgets, input boxes, and so forth. The customer uses the service request template to identify the software product and issue encountered, and input configuration detail. FIG. 15 shows an example of information that may be included in a service request template 1505.

With the system, many manual steps are converted into automated ones. In particular, the interpreter of the management module parses the values input by the customer into a service request to identify the application associated with the customer's issue, the operating system of the customer, and the configuration properties of the application and operating system.

The management module includes logic or code to invoke or issue commands, instructions, or requests to the various sub-modules (e.g., OS setup engine, software product configuration engine, task scheduler, notification module, and retain/purge component). The sub-modules may include a programmatic interface (e.g., application program interface (API)) for communicating with the management module. For example, the management module may pass a value from the service request through an API of the OS setup engine that indicates to the OS setup engine the operating system that should be retrieved from the OS repository. The management module may pass another value from the service request through an API of the software product configuration engine that indicates to the software product configuration engine the application that should be retrieved from the software repository. The sub-modules, such as the OS setup engine and software product configuration engine, likewise include logic or code to properly configure in the testing environment the application and the operating system according to the configuration specified in the service request. Other examples of automation techniques are described in U.S. patent application Ser. No. 13/618,634, filed Sep. 14, 2012, now U.S. Pat. No. 8,713,554, issued Apr. 29, 2014, which is incorporated by reference along with all other references cited herein.

The customer environment can be simulated in an automated fashion for groups such as development, quality assurance, Current Product Engineering (CPE) (CPE refers to a sustaining team that provides product maintenance after the product is released to market via hotfixes, rollup patches, and service packs), and others. It should be appreciated that the system is applicable to both Purpose Built Backup Appliances (PBBA) as well as Software Solutions. In regards to PBBA, there can be in-built modules to efficiently serve this capability.

Some disadvantages of the previous approaches are listed below:

1) Labor intensive—needs a lot of effort to even perform the first or initial analysis and that too needs a lot of back and forth discussions as it is manual effort and there are chances to miss information.

2) Error Prone—A large portion of the service request template included free text which resulted in a subjective attribute to the problem filing which lead to various interpretations. Also, in some cases the error filing was not uniform with different people having a different understanding of the issue.

3) Not a real-time environment—As there are various subjective understandings of the issues, it leads to the environment that was not the exact replica of the issue environment and hence more time was required to calibrate/diagnose the issue.

4) Reusability and Tracking Issues—There was no creating of a template and mapping of the configuration to the SR so that same template could be used in future as well. Efforts had to be repeated. There was no template to be leveraged for similar SR and issues.

Some advantages of the system are listed below:

1) Streamlined and data driven—Information is pulled out automatically without or with little user intervention. Also, the standard template format helps with the structure and uniformity which helps the parser to interpret the customer environment.

2) Structured—Less user intervention means less probability for subjectivity and user interpretations. Hence less of error probability.

3) Real-time environment based—Mapping to the real-time customer data allows the environment to be very close to the customer deployment environment thereby making the debugging and diagnosis robust.

4) Better Reusability and Tracking—Model keeps track of customer issue, customer environment details along with the template. Any future effort can easily be addressed on a very short notice.

Figure 10:
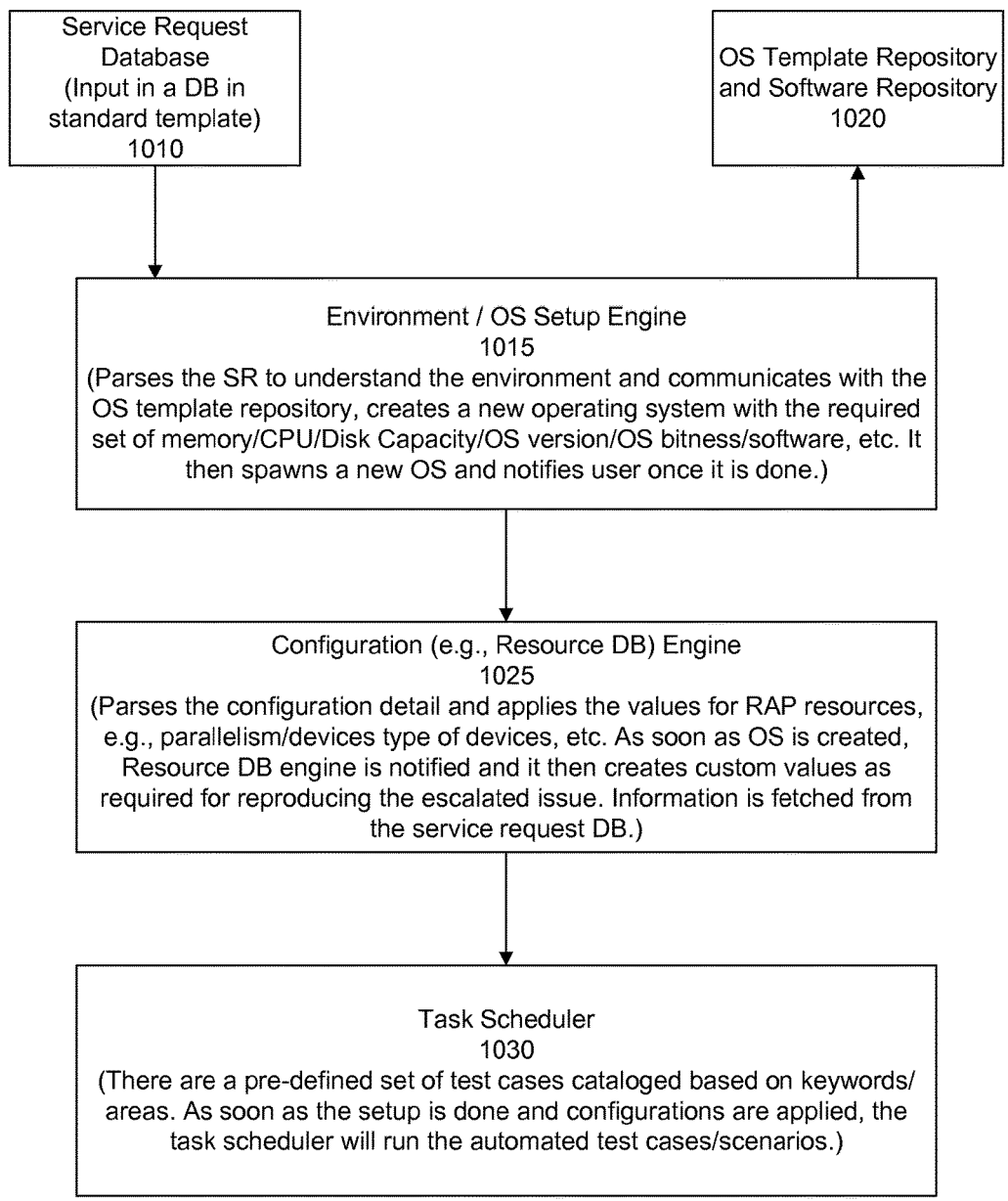
FIG. 10 shows an architecture of a specific embodiment of the system.
Figure 11:
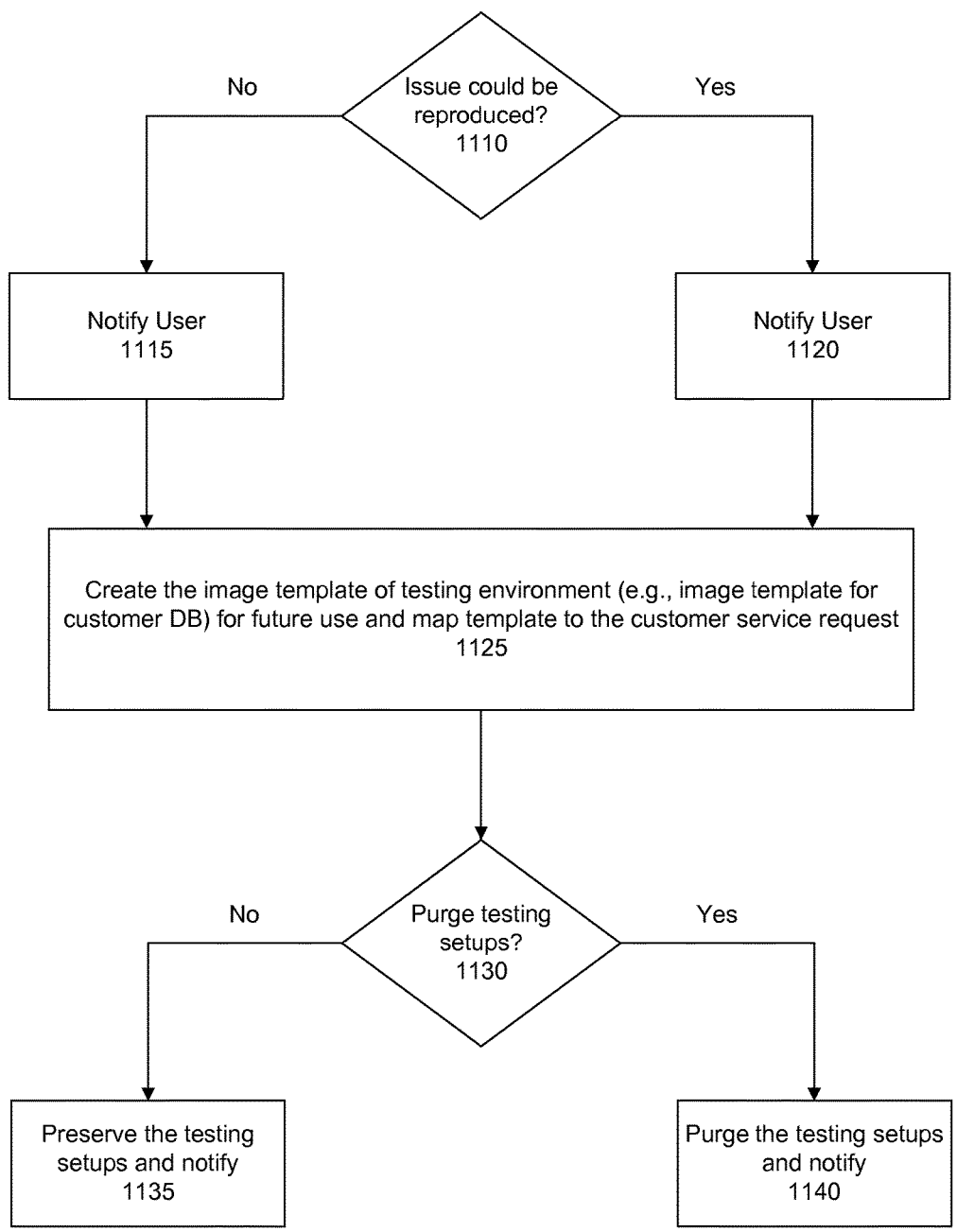
FIG. 11 shows a workflow diagram of a specific embodiment of the system.

FIGS. 10 and 11 show an architecture and workflow diagram, respectively, of a specific embodiment of the system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

Referring now to FIG. 10, in a step 1010, a service request from the customer is received and stored in the service request database. The service request is provided to the environment/OS setup engine. In a step 1015, the environment/OS setup engine parses the service request to understand the customer environment, communicates with OS template and software repository 1020, and creates a new environment having the operating system and configuration specified in the service request (e.g., having the required set of memory, CPU, disk capacity, OS version, OS bitness, software, and so forth). The engine can spawn a new OS and notify the user once it is complete.

In a step 1025, the software product configuration engine (e.g., resource database engine) parses the configuration details specified in the service request and applies or sets the configuration values (e.g., applies the values for RAP resources such as parallelism/devices, types of devices, and so forth). In a specific embodiment, as soon as the OS is created (e.g., upon the operating system being installed in the virtual machine test environment), the resource database engine is notified and custom values are created as required for reproducing the issue. In a specific embodiment, the information is retrieved from the service request database.

In a step 1030, the task scheduler runs one or more test cases in the test environment. In a specific embodiment, there are a set of predefined test cases that are cataloged based on keywords, areas, or both. Once the test environment has been provisioned and the configurations are applied, the task scheduler runs the test cases/scenarios which are automated.

FIG. 11 shows a workflow of a specific embodiment of the system. In a step 1110, the system determines whether the issue specified in the service request was reproduced in the test environment. If the issue was not reproduced, in a step 1115, a notification is generated that includes a message indicating that the issue could not be reproduced. If the issue was reproduced, in a step 1120, a notification is generated that includes a message indicating that the issue was reproduced.

In a step 1125, the system creates an image template of the testing or setup environment including the software product (e.g., customer database) for future use and maps the template to the service request.

In a step 1130, a decision can be made on whether to purge the testing environments. If the determination is to preserve the testing environments, in a step 1135, the environment is preserved and a notification may be generated that includes a message indicating that the testing environment has been maintained. If the determination is to purge the testing environments, in a step 1140, the testing environment is purged and a notification may be generated that includes a message indicating that the testing environment has been deleted (e.g., a virtual machine having the specified software product, operating system, and configuration is deleted).

Recreating the testing environment from the disk image template can be faster than recreating the environment from scratch (e.g., fetching an operating system from the OS repository, fetching a software product from the software repository, and configuring the environment). Maintaining the disk image, however, requires computing resources such as storage space. Deleting the image helps to conserve the computing resources. Factors in determining whether the image should be deleted include, for example, the size of the disk image, the time and resources required to recreate the testing environment without the disk image, the time and resources required to recreate the testing environment with the disk image, the likelihood of the customer experiencing the same or different issue, and others.

For example, if there is a low likelihood that the customer will experience another issue and thus submit another service request, the image may be purged to conserve storage space. Alternatively, if there is a high likelihood that the customer may experience the same or different issue, the image may be maintained so that the testing environment can be quickly restored. The disk images of the testing environments may be compressed to reduce storage requirements. In a specific embodiment, a testing administrator can decide whether to maintain or purge a testing environment. Instead or additionally, there can be a user-defined maintenance policy in which a testing environment may be automatically purged after a user-specified period of time has elapsed. For example, an administrator may specify in a policy that testing environments older than 1 month should be purged.

Figure 12A:
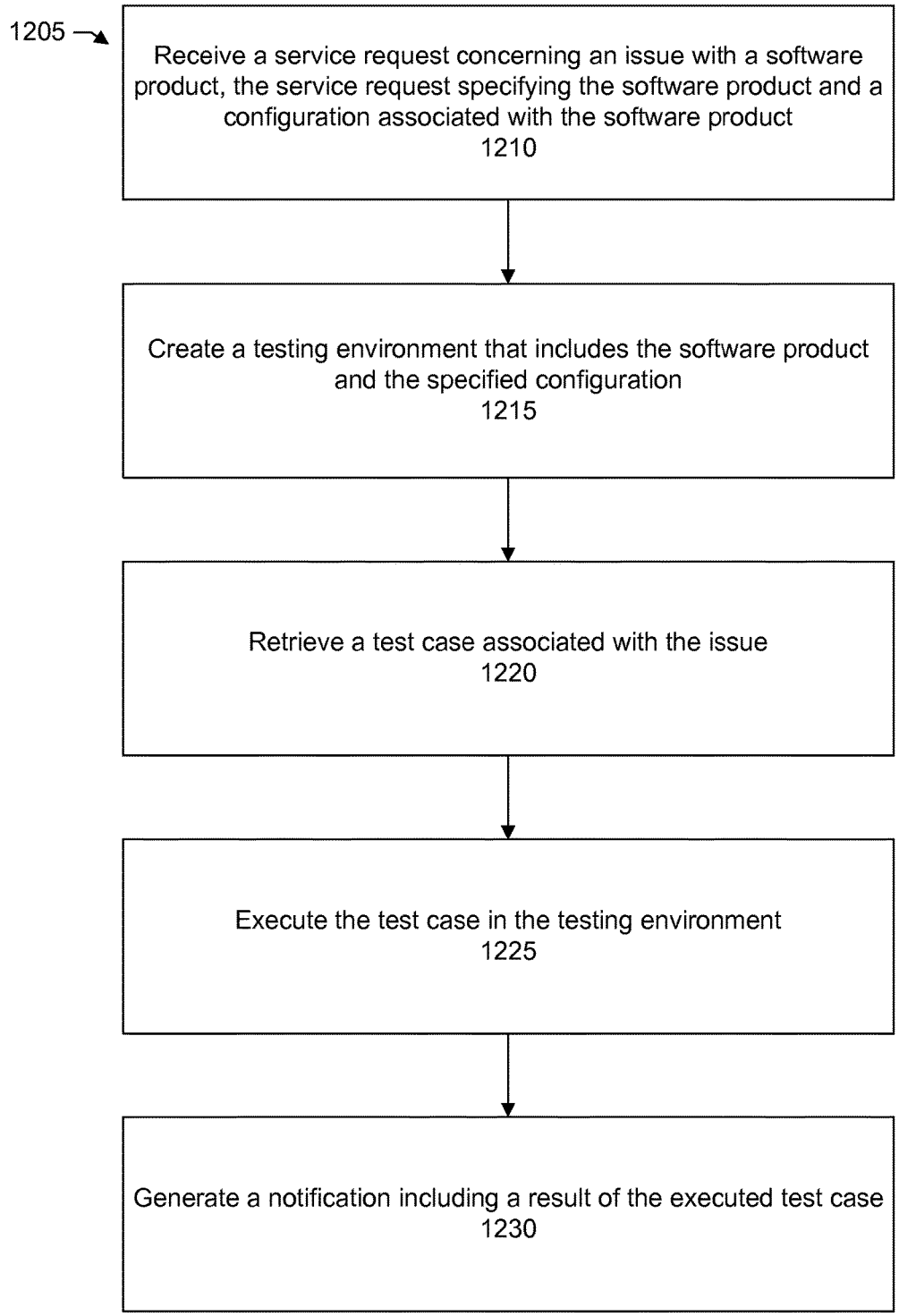
FIG. 12A shows an overall flow diagram for automatically creating testing environments in a specific embodiment of the system.

FIG. 12A shows an overall flow 1205 of the system in a specific embodiment.

In a step 1210, the system receives a service request concerning an issue with a software product (e.g., software application), the service request specifying the product and a configuration associated with the product.

FIG. 12B shows an example of a service request template or form 1235. The service request template may be displayed within a browser. As shown in the example of FIG. 12B, the SR template includes a set of fields 1238 and a corresponding set of input boxes 1241. The customer completes the service request by entering the appropriate values in the input boxes. The template helps to provide a standard structure for collecting the information needed to create a realistic testing environment. The specific fields on the template help to ensure that there is no missing information. An input box may include a dropdown menu where the user can select from among a set of options or values in the menu. The menu options may be populated based on the value the customer supplied for another field. For example, once the customer inputs their name, the input box for the product field may include a dropdown menu that is populated with the software products that the customer has purchased or licensed. This helps to reduce data entry errors because the customer will choose from a pre-determined list of values.

Once the customer completes the service request, the customer can click the "Submit" button to submit the request to the system. The customer supplied input values can be extracted and stored in the service request database in the respective database fields that are mapped to the fields of the service request.

The configuration details specified by the customer in a service request can include OS configuration parameters, software product configuration parameters, or both. Configuration parameters may include the software version, operating system and version, service pack, build, details of the customer computer system (e.g., memory, central processing unit (CPU), disk capacity, or OS bitness), generic network settings, network protocols, block sizes for cache, memory, disk, or combinations of these, procedures for writing to or reading from cache, memory, disk, or combinations of these, buffer sizes, display settings, settings for communication protocols used by the operating system, power saving settings (e.g., suspend/sleep mode), language setting (e.g., English, Chinese, or German), types of attached hardware devices, types of attached virtual devices, path locations for input, output, or both, a list of installed application modules, a list of application add-ins, session timeouts, security settings, or names of other installed applications, among others.

A particular configuration parameter may or may not be configurable by the user. For example, a particular application may allow the user to specify a particular folder or path in which output from the application will be stored. A default value may be provided that the user can override. It can be desirable to configure the testing environment such that it corresponds to the configuration of the customer's computer system. This helps to ensure a realistic test environment in order to isolate the problem and verify the compatibility of the software product with other elements, components, and settings.

As a discussed above, in a specific embodiment, the configuration details are input by the customer into a service request template. In another specific embodiment, the configuration detail may be provided by the customer in one or more configuration files separate from the service request. For example, the configuration file may be uploaded as an attachment to the service request or otherwise provided to the system in a separate transmission. In this specific embodiment, the system includes a parser to analyze the configuration file and extract the relevant configuration parameters, values, settings, attributes, variables, properties, and so forth. The configuration file may be formatted as, for example, an extensible markup language (XML) file, text file, or other.

Figure 12C:
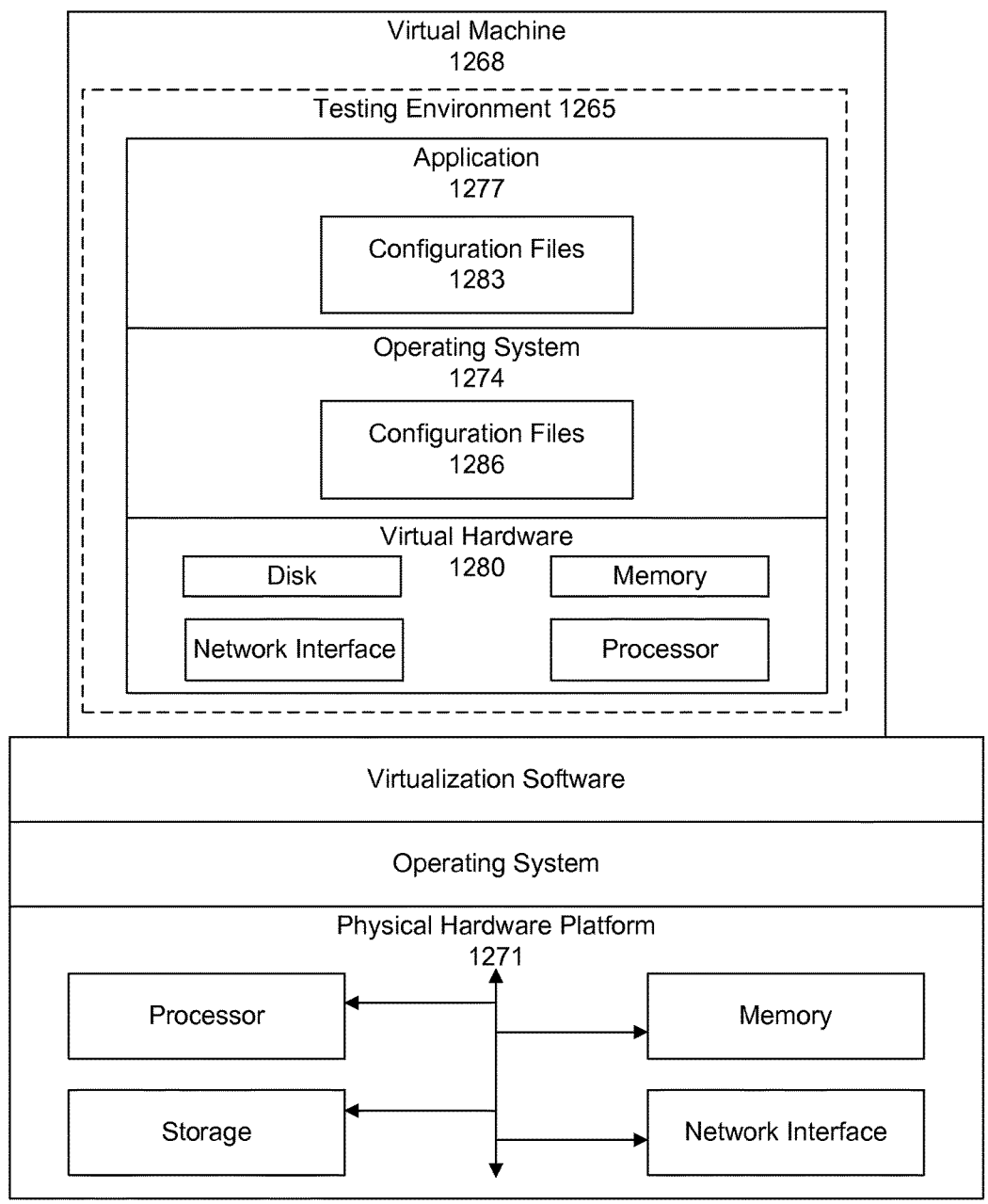
FIG. 12C shows block diagram of a testing environment that was automatically created and configured in a specific embodiment of the system.

In a step 1215, the system automatically creates a testing or setup environment that includes the software product and the configuration specified in the service request. FIG. 12C shows an example of a testing environment 1265 that may be created within a virtual machine 1268 on a host machine 1271 of the testing server system. The testing environment is automatically created and configured by the OS environment setup engine and software product configuration engine. As shown in the example of FIG. 12C, the testing environment includes an operating system 1274 installed as a guest on the host hardware platform, an application 1277 installed as a guest on the host hardware platform, and virtual hardware 1280. As discussed, automatically creating and configuring the testing environment includes parsing through the service request template to discover the operating system and application that should be installed in the testing environment. The system makes the appropriate calls and requests to other sub-modules to spawn the particular operating system and install the particular application on top of the operating system. In a specific embodiment, the virtual machine environment includes a hypervisor referred to as Hyper-V, as provided by VMware. In other embodiments, other hypervisors may be used.

Each of the application and operating system further include one or more configuration files. For example, one or more configuration files 1283 may be associated with the application. One or more configuration files 1286 may be associated with the operating system. A configuration file can include a configuration property and a corresponding configuration value. In a specific embodiment, the configuration values are automatically set by the OS environment setup engine or the software product configuration engine according to the configuration value from the customer's service request. These sub-module setup engines can include logic to identify the locations (e.g., folder paths) where the configuration data is stored, and logic to alter the configuration data so that it corresponds to the configuration information as supplied by the customer in the service request.

For example, an installation of an operating system, software product, or both may include a default value of a particular configuration parameter. In some cases, the customer may have overridden that default value, e.g., changed the default value to a custom value. Thus, configuring the testing environment may include changing a configuration parameter from a first value to a second value, different from the first value. The first value may be a default value. The second value may be a value as specified in the service request or a configuration file. The configuration parameter may be associated with the operating system (e.g., an operating system specific configuration parameter). The configuration parameter may be associated with the software product (e.g., an application specific configuration parameter).

As further examples, configuring the testing environment may including resizing a virtual hard disk of the testing environment from a default size to a size as specified in the service request. Configuring the testing environment may include changing an amount of virtual memory allocated to the virtual machine in the testing environment from a default value to a value as specified in the service request. Configuring the testing environment may include adding a device (e.g., adding a virtual device) that corresponds to a device specified in the service request. The device can be, for example, a network adaptor, hard disk, optical drive (e.g., CD/DVD drive), sound card, USB device, Bluetooth device, serial port, or parallel port—just to name a few examples.

In another specific embodiment, one or more configuration files provided by the customer may be used in the testing environment to replace a default configuration file as provided during the installation of the operating system, software product, or both in the testing environment. In a specific embodiment, configuration information is stored in a database referred to as a resource database. For Windows operating systems, configuration information may be stored in a Windows registry database. The Windows Registry is a hierarchical database that stores configuration settings and options on Microsoft Windows operating systems. It includes settings for low-level operating system components and for applications running on the platform that use the registry. Configuration information may be stored in any appropriate format. For example, the configuration information may be stored as a text file, or Extensible Markup Language (XML) file.

In a step 1220, the system retrieves the test case associated with the issue identified in the service request. In a specific embodiment, the test cases may be tagged or indexed based on the software product and feature of the software product that the test case is designed to test. For example, a first test case may be tagged as "testcase1.networker.backup." A second test case may be tagged as "testcase2.networker.recovery." And so forth. In this example, the test cases are associated with the NetWorker application. The first test case is designed to test the backup feature of the application. The second test case is designed to test the recovery feature of the application.

In this specific embodiment, the service request may include an issue type that allows the customer to select the feature, area, or function of the application where the issue was encountered. For example, for the NetWorker application, the customer may select "backup" if the issue concerns the backup feature of the application, or select "recovery" if the issue concerns the recovery feature of the application. In this specific embodiment, the system can identify the test case to retrieve by scanning the test case repository via the test case tags for a tag that corresponds or matches the issue type from the service request. For example, if the user selected the issue type as "backup," the system may retrieve the first test case. If the user selected the issue type as "recovery," the system may retrieve the second test case.

In another specific embodiment, there is a mapping table that stores information mapping a test case to a particular component or sub-feature of the application or system. The task scheduler can automatically identify the particular component or sub-feature specified in the service request and then automatically select the appropriate test case to run. For example, a particular application or system may be decomposed into multiple feature areas. Each feature area may be decomposed into multiple sub-areas. Each sub-area may be associated with specific component/test modules. The task scheduler can identify from the service request the particular feature, sub-feature, and module, cross-reference the information with the mapping table, and then run the mapped test cases.

In a step 1225, the test case is executed in the testing environment. In a specific embodiment, there is a pre-compiled list of test cases and automated test scripts are run.

In a step 1230, a notification is generated that includes a result of the executed test case. The result indicates whether or not the issue was reproduced. If the issue can be reproduced, a further notification or workflow may be triggered to escalate the issue to a development team so that the team can create a patch or update that addresses the issue. If the issue cannot be reproduced, additional tests may be run, the customer may be prompted or asked to provide additional information such as additional configuration information, or both.

Figure 13:
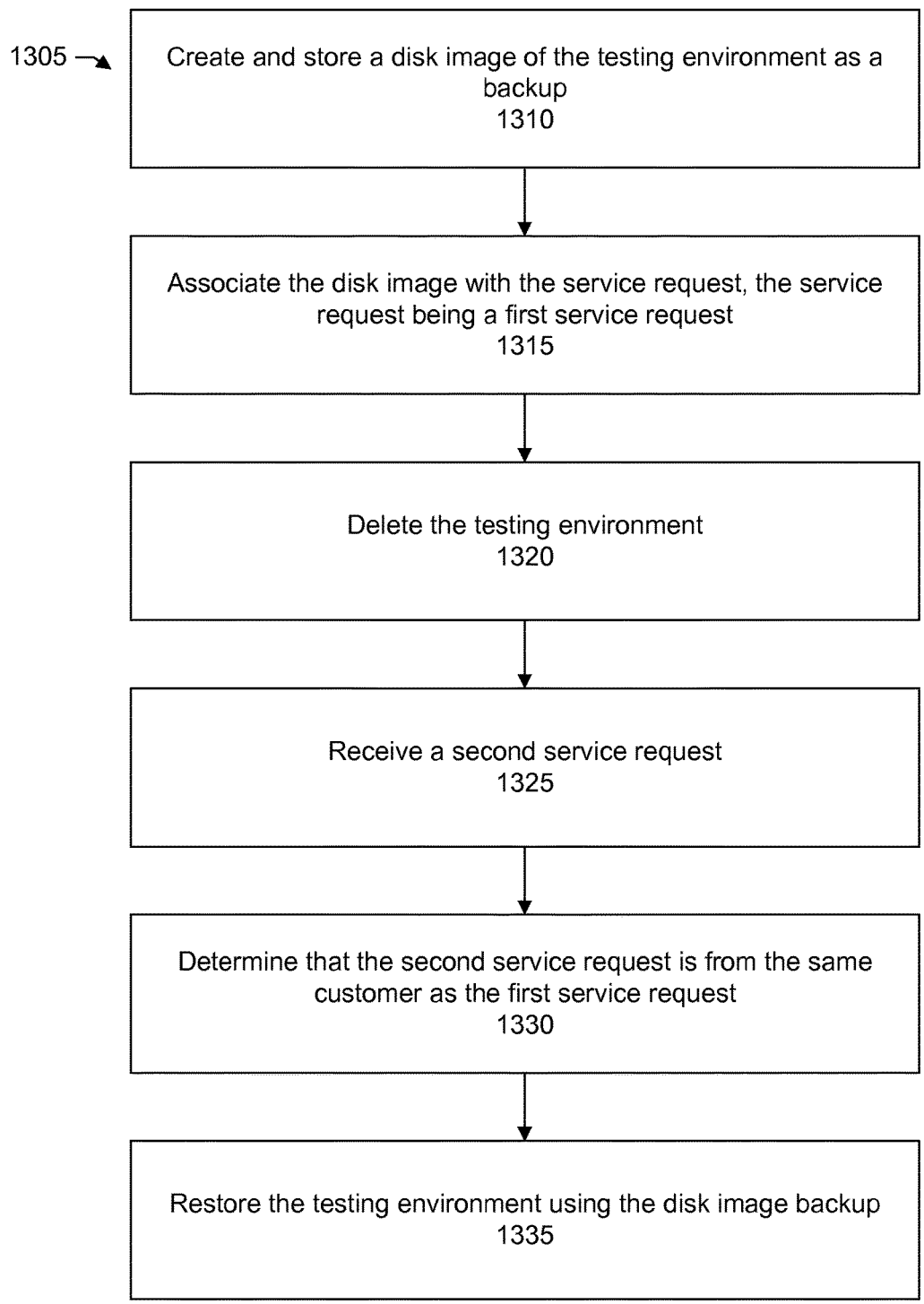
FIG. 13 shows a flow diagram for automatically restoring a testing environment in a specific embodiment of the system.

FIG. 13 shows another flow 1305 of the system in a specific embodiment. In a step 1310, the system creates and stores as a backup a disk image of the testing environment. In a step 1315, the disk image is associated with the service request, the service request being a first service request. In a step 1320, the system deletes the testing environment. For example the system may delete, remove, or purge the virtual machine having the testing environment from the host machine. Deleting the virtual machine releases computing resources so that the host machine is available for other tasks.

In a step 1325, the system receives a second service request. In a step 1330, a determination is made that the second service request is from the same customer as the first service request. More particularly, the system may obtain the name of the customer from the second service request and scan the backup disk image repository of the testing environments using the customer name or other suitable customer identifier. For example, the customer may have previously submitted a service request to the system for the same or a different issue and a testing environment created to investigate the previous issue may have been backed up and archived by the system.

In a step 1335, the testing environment is restored using the disk image. As discussed above, restoring the testing environment using the disk image can be much faster than recreating the testing environment from scratch. Alternatively, if the disk image associated with the customer cannot be obtained, the testing environment can be created using the information specified in the service request (see, e.g., FIG. 10).

Figure 14:
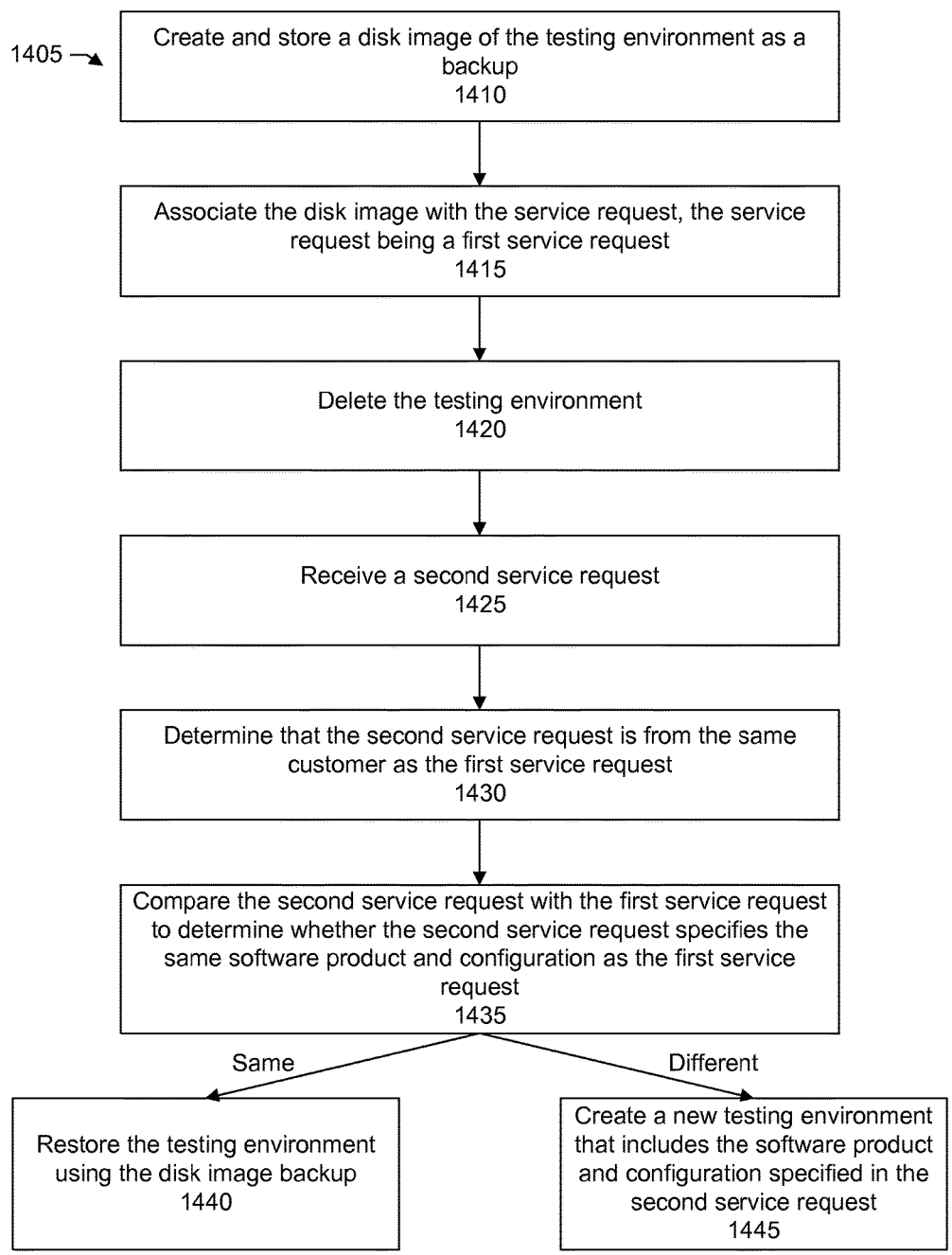
FIG. 14 shows a flow diagram for automatically restoring or creating a new testing environment in a specific embodiment of the system.

In some cases, a customer may have changed, altered, or modified their computing deployment environment. Thus, prior to restoring the testing environment using the disk image, it can be desirable to determine whether such a change has occurred. For example, FIG. 14 shows a flow for determining whether a testing environment should be restored using the testing environment disk image or created from scratch. Steps 1410-1430 are similar to steps 1310-1330 shown in FIG. 13 and discussed above.

In a step 1435, the system compares the second service request with the first service request to determine whether the second service request specified the same software product and configuration as the first service request. For example, as discussed above, the customer after submitting the first service request may have modified their computing deployment environment. A patch, update, or service pack may have been installed. The customer may have migrated the software product to a different computing system. The customer may have changed an operating system configuration setting, a software product configuration setting, or both. Instead or additionally, the second service request may concern a software product different from the software product of the first service request.

If the software product and configuration are the same, in a step 1440, the system restores the testing environment using the backup disk image. A test case can then be run in the restored testing environment to determine if the issue in the second service request can be reproduced. Alternatively, if the software product, configuration, or both are different, in a step 1445, the system creates a new testing environment that includes the software product and configuration specified in the second service request. A test case can then be run in the new testing environment to determine if the issue in the second service request can be reproduced.

In a specific embodiment, a method includes receiving, at a first computer system, a service request from a customer, the service request concerning an issue with an application, the application being installed in a second computer system, the service request comprising a plurality of fields, and a plurality of values, the plurality of values having been input by the customer, parsing the plurality of values of the service request to identify the application, an operating system of the second computer system, and a configuration setting, wherein the application is identified by a first value inputted for a first field, the operating system is identified by a second value inputted for a second field, and the configuration setting is identified by a third value inputted for a third field, automatically creating a testing environment within a virtual machine at the first computer system, the testing environment comprising the application identified by the first value, the operating system identified by the second value, and the configuration setting identified by the third value, retrieving a test case associated with the issue, executing the test case in the testing environment, and generating a notification comprising a result of the executed test case.

In another specific embodiment, there is a system of testing an application, the system comprising: a processor-based testing system executed on a computer system and configured to: receive, at a first computer system, a service request from a customer, the service request concerning an issue with the application, the application being installed in a second computer system, the service request comprising a plurality of fields, and a plurality of values, the plurality of values having been input by the customer, parse the plurality of values of the service request to identify the application, an operating system of the second computer system, and a configuration setting, wherein the application is identified by a first value inputted for a first field, the operating system is identified by a second value inputted for a second field, and the configuration setting is identified by a third value inputted for a third field, automatically create a testing environment within a virtual machine at the first computer system, the testing environment comprising the application identified by the first value, the operating system identified by the second value, and the configuration setting identified by the third value, retrieve a test case associated with the issue, execute the test case in the testing environment, and generate a notification comprising a result of the executed test case.

In another specific embodiment, there is a computer program product, comprising a non-transitory computer-readable medium having a computer-readable program code embodied therein, the computer-readable program code adapted to be executed by one or more processors to implement a method comprising: receiving, at a first computer system, a service request from a customer, the service request concerning an issue with an application, the application being installed in a second computer system, the service request comprising a plurality of fields, and a plurality of values, the plurality of values having been input by the customer, parsing the plurality of values of the service request to identify the application, an operating system of the second computer system, and a configuration setting, wherein the application is identified by a first value inputted for a first field, the operating system is identified by a second value inputted for a second field, and the configuration setting is identified by a third value inputted for a third field, automatically creating a testing environment within a virtual machine at the first computer system, the testing environment comprising the application identified by the first value, the operating system identified by the second value, and the configuration setting identified by the third value, retrieving a test case associated with the issue, executing the test case in the testing environment, and generating a notification comprising a result of the executed test case.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

receiving, at a first computer system, a first service request from a customer, the first service request identifying an issue with an application that has been installed in a second computer system, the first service request comprising a plurality of fields, and a plurality of values, the plurality of values having been input by the customer;

parsing the plurality of values of the first service request to identify the application, an operating system of the second computer system, and a configuration setting, wherein the application is identified by a first value inputted for a first field, the operating system is identified by a second value inputted for a second field, and the configuration setting is identified by a third value inputted for a third field;

automatically creating a testing environment within a virtual machine remote from the second computer system, the testing environment comprising the application identified by the first value, the operating system identified by the second value, and the configuration setting identified by the third value;

storing, in a test case repository, a plurality of test cases, each test case having been cataloged with keywords;

retrieving, from the test case repository, a test case associated with the issue identified in the first service request, the retrieving comprising matching the values input by the customer into the first service request with keywords of the test case;

executing the test case in the testing environment;

generating a notification comprising a result of the executed test case;

storing a disk image of the testing environment in a setup repository;

tagging the disk image stored in the setup repository with the first service request, thereby associating the stored disk image with the first service request;

determining whether to delete or maintain the stored disk image by evaluating a plurality of factors, the plurality of factors comprising a size of the stored disk image, a time required to recreate the testing environment without the stored disk image, and a time required to recreate the testing environment with the stored disk image;

receiving a second service request from the customer;

comparing the second service request with the first service request, when a determination was made to maintain the stored disk image, to determine whether the second service request specifies a configuration that is the same as a configuration specified in the first service request; and if the configuration specified in the second service request is the same as the configuration specified in the first service request, retrieving the stored disk image associated with the first service request to recreate the testing environment for the second service request, wherein each of the first and second service requests are different from the disk image.

2. The method of claim 1 wherein the automatically creating a testing environment comprises:

retrieving the operating system from an operating system repository at the first computer system, the operating system repository storing a plurality of different operating system images; and installing the operating system in the testing environment.

3. The method of claim 1 wherein the automatically creating a testing environment comprises:

retrieving the application from an application repository at the first computer system, the application repository storing a plurality of different application images; and installing the application in the testing environment.

4. The method of claim 1 wherein the automatically creating a testing environment comprises changing a configuration of the application in the testing environment from a default value to the third value.

5. The method of claim 1 wherein the automatically creating a testing environment comprises changing a configuration of the operating system in the testing environment from a default value to the third value.

6. The method of claim 1 comprising:

if the configuration specified in the second service request is different from the configuration specified in the first service request, not retrieving the stored disk image; and after the not retrieving the stored disk image, creating another testing environment based on the configuration specified in the second service request.

7. The method of claim 1 comprising:

deleting the virtual machine having the testing environment;

receiving, at the first computer system, a third service request from the customer identifying a third issue with the application, the third service request comprising a third plurality of fields, and a third plurality of values, the third plurality of values having been input by the customer;

comparing the third service request with the first service request to determine whether a value of the third plurality of values is different from a corresponding value of the plurality of values; and if the value in the third service request is different from the corresponding value in the first service request automatically creating, without using the disk image, another testing environment within another virtual machine remote from the second computer system.

8. A system of testing an application, the system comprising:

a processor-based testing system executed on a computer system and configured to:

receive, at a first computer system, a first service request from a customer, the first service request describing an issue with the application, the application having been installed in a second computer system, the first service request comprising a plurality of fields, and a plurality of values, the plurality of values having been input by the customer;

parse the plurality of values of the first service request to identify the application, an operating system of the second computer system, and a configuration setting, wherein the application is identified by a first value inputted for a first field, the operating system is identified by a second value inputted for a second field, and the configuration setting is identified by a third value inputted for a third field;

automatically create a testing environment within a virtual machine remote from the second computer system, the testing environment comprising the application identified by the first value, the operating system identified by the second value, and the configuration setting identified by the third value;

store, in a test case repository, a plurality of test cases, each test case having been cataloged with keywords;

retrieve, from the test case repository, a test case associated with the issue described in the first service request, the retrieval comprising a match of the values input by the customer into the first service request with keywords of the test case;

execute the test case in the testing environment;

generate a notification comprising a result of the executed test case, wherein the first service request is received at the first computer system after the application has been installed in the second computer system;

store a disk image of the testing environment in a setup repository, wherein the setup repository is separate from a host of the virtual machine and comprises a plurality of other disk images that have been tagged with other service requests from other customers and that correspond to other different testing environments;

tag the disk image stored in the setup repository with the first service request, thereby associating the stored disk image with the first service request;

determine whether to delete or maintain the stored disk image by evaluating a plurality of factors, the plurality of factors comprising a size of the stored disk image, a time required to recreate the testing environment without the stored disk image, and a time required to recreate the testing environment with the stored disk image;

receive a second service request from the customer;

compare the second service request with the first service request to determine whether the second service request specifies a configuration that is the same as a configuration specified in the first service request; and if the configuration specified in the second service request is the same as the configuration specified in the first service request, retrieve the stored disk image associated with the first service request to recreate the testing environment for the second service request, wherein each of the first and second service requests are different from the disk image.

9. The system of claim 8 wherein the processor-based testing system is further configured to:

if an operating system specified in the second service request is different from an operating system specified in the first service request, retrieve the operating system specified in the second service request from an operating system repository at the first computer system, the operating system repository storing a plurality of different operating system images; and install the operating system in a new testing environment.

10. The system of claim 8 wherein the processor-based testing system is further configured to:

retrieve the application from an application repository at the first computer system, the application repository storing a plurality of different application images; and install the application in the testing environment.

11. The system of claim 8 wherein the processor-based testing system is further configured to change a configuration of the application in the testing environment from a default value to the third value.

12. The system of claim 8 wherein the processor-based testing system is further configured to change a configuration of the operating system in the testing environment from a default value to the third value.

13. The system of claim 8 wherein the processor-based testing system is further configured to:

if the configuration specified in the second service request is different from the configuration specified in the first service request, create another testing environment based on the configuration specified in the second service request, wherein the other testing environment is created without using the stored disk image because the configuration specified in the second service request is different from the configuration specified in the first service request.

14. The system of claim 8 wherein the processor-based testing system is further configured to:

delete the virtual machine having the testing environment;

receive, at the first computer system, a third service request from the customer describing a third issue with the application, the third service request comprising a third plurality of fields, and a third plurality of values, the third plurality of values having been input by the customer;

compare the third service request with the first service request to determine whether a value of the second plurality of values is different from a corresponding value of the plurality of values; and if the value in the third service request is different from the corresponding value in the first service request automatically create, without using the disk image, another testing environment within another virtual machine remote from the second computer system.

15. A computer program product, comprising a non-transitory computer-readable medium having a computer-readable program code embodied therein, the computer-readable program code adapted to be executed by one or more processors to implement a method comprising:

receiving, at a first computer system, a first service request from a customer, the first service request identifying an issue with an application that has been installed in a second computer system, the first service request comprising a plurality of fields, and a plurality of values, the plurality of values having been input by the customer;

parsing the plurality of values of the first service request to identify the application, an operating system of the second computer system, and a configuration setting, wherein the application is identified by a first value inputted for a first field, the operating system is identified by a second value inputted for a second field, and the configuration setting is identified by a third value inputted for a third field;

automatically creating a testing environment within a virtual machine remote from the second computer system, the testing environment comprising the application identified by the first value, the operating system identified by the second value, and the configuration setting identified by the third value;

storing, in a test case repository, a plurality of test cases, each test case having been cataloged with keywords;

retrieving, from the test case repository, a test case associated with the issue identified in the first service request, the retrieving comprising matching the values input by the customer into the first service request with keywords of the test case;

executing the test case in the testing environment;

generating a notification comprising an indication of whether or not the issue was reproduced in the testing environment;

storing a disk image of the testing environment in a setup repository, wherein the setup repository is separate from a host of the virtual machine and comprises a plurality of other disk images that have been tagged with other service requests from other customers and that correspond to other different testing environments;

tagging the disk image stored in the setup repository with the first service request, thereby associating the stored disk image with the first service request;

determining whether to delete or maintain the stored disk image by evaluating a plurality of factors, the plurality of factors comprising a size of the stored disk image, a time required to recreate the testing environment without the stored disk image, and a time required to recreate the testing environment with the stored disk image;

receiving a second service request from the customer;

comparing the second service request with the first service request, when a determination was made to maintain the stored disk image, to determine whether the second service request specifies a configuration that is the same as a configuration specified in the first service request; and if the configuration specified in the second service request is the same as the configuration specified in the first service request, retrieving the stored disk image associated with the first service request to recreate the testing environment for the second service request, wherein each of the first and second service requests are different from the disk image.

16. The computer program product of claim 15 wherein the method comprises:

if an operating system specified in the second service request is different from an operating system specified in the first service request, retrieving the operating system specified in the second service request from an operating system repository at the first computer system, the operating system repository storing a plurality of different operating system images; and installing the operating system in a new testing environment.

17. The computer program product of claim 15 wherein the method comprises:

if an application specified in the second service request is different from an application specified in the first service request, retrieving the application specified in the second service request from an application repository at the first computer system, the application repository storing a plurality of different application images; and installing the application in a new testing environment.

18. The computer program product of claim 15 wherein the method comprises changing a configuration of the application in the testing environment from a default value to the third value.

19. The computer program product of claim 15 wherein the method comprises changing a configuration of the operating system in the testing environment from a default value to the third value.

20. The computer program product of claim 15 wherein the method comprises:

if the configuration specified in the second service request is different from the configuration specified in the first service request, not retrieving the stored disk image; and after the not retrieving the stored disk image, creating another testing environment based on the configuration specified in the second service request.

* * * * *